(12) United States Patent
Wong et al.

(10) Patent No.: US 7,538,731 B2
(45) Date of Patent: May 26, 2009

(54) USER CONFIGURABLE WIRELESS ANTENNA MODULE FOR COMPUTING PLATFORMS

(75) Inventors: Hong W. Wong, Portland, OR (US); Wah Yiu Kwong, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 90 days.

(21) Appl. No.: 11/715,135

(22) Filed: Mar. 7, 2007

(65) Prior Publication Data

US 2008/0218423 A1    Sep. 11, 2008

(51) Int. Cl.
*H01Q 1/24* (2006.01)

(52) U.S. Cl. ...................... 343/702; 343/892

(58) Field of Classification Search ............ 343/702, 343/892, 906, 872
See application file for complete search history.

(56) References Cited

U.S. PATENT DOCUMENTS

| 2002/0002061 A1* | 1/2002 | Miyasaka et al. | ........... 455/557 |
| 2002/0101378 A1* | 8/2002 | Quinn et al. | ................. 343/702 |
| 2003/0169205 A1* | 9/2003 | Gioia et al. | ................. 343/702 |

* cited by examiner

*Primary Examiner*—Hoang V Nguyen
(74) *Attorney, Agent, or Firm*—Kacvinsky LLC

(57) ABSTRACT

A removable antenna is configured for a computing platform. This configuring, for example, includes; mounting a bracket on the computing platform designed to accommodate a removable antenna and a removable signal compatible dome. The removable antenna is mounted on the bracket, and the removable signal compatible dome, configured at least in part on the removable antenna, is also mounted on the bracket.

18 Claims, 4 Drawing Sheets

USER CONFIGURABLE WIRELESS ANTENNA MODULE FOR COMPUTING PLATFORMS

BACKGROUND

Most computing platforms include an option for receiving wireless signals through a permanent fixed antenna or antennas. Typically, original equipment manufacturers (OEMs) or channel manufacturers of mobile computing platforms choose wireless connectivity options for various computing platforms at initial construction. These antenna configurations are intended to be permanent and receive a limited type of signal or signals. This may limit the end user to only those signals for which the computing platform was designed and originally constructed. Each antenna on the computing platform is usually associated and co-located with a structure referred to as a "dome." A dome, for example, is typically constructed of material which allows a signal to pass through to the antenna and also protects the antenna from the external environment while conforming to the shape of the computing platform.

With the recent expansion in types of wireless signals and services available, manufacturers or end-users may desire to upgrade existing computing platforms to receive new types of signals and the capabilities associated with those new signals. End users or manufacturers may choose for example to add global positioning satellite (GPS) reception, television reception, and Industrial Electrical and Electronics Engineers (IEEE) 802.11 (Wi-Fi) or IEEE 802.16 (WiMax) connectivity to a computing platform not originally equipped for these signals. Antennas intended to be permanently fixed to a computing platform can be difficult to change because of the unique configuration requirements associated with each wireless signal. Typically, an antenna for one type of signal requires a separate internal connection to the computing platform, a compatible dome, and also requires a specific location on the computing platform for optimal performance. Changing an antenna configuration to match a new type of wireless signal usually involves disassembling the computing platform and likely adjusting its delicate and precise existing configuration. In the alternative, end-users or manufacturers often add new, external, self contained antennas through preexisting external connections on the computing platform. These preexisting external connections include, for example, Personal Computer Memory Card International Association (PCMCIA), serial, or Universal Serial Bus (USB) ports. This external antenna solution may then provide a new type of wireless solution configuration capability for a computing platform.

DETAILED DESCRIPTION

Taking an existing computing platform apart to change a permanently installed antenna, as mentioned in the background, is costly in terms of skill and labor due to the unique configuration requirements for each received signal type and the delicate nature of connecting a specified antenna to the computing platform. For example, in a typical laptop computing platform the antennas are connected to the processor via a thin Radio frequency (RF) coax cable threaded along the edge or behind the screen in the lid, and down through a hinge assembly or a thin cable to the main body of the computing platform. This length of cable fits the location of the antenna precisely to account for the opening and closing of the laptop lid and to facilitate repeated opening and closing over the lifetime of the device. An improperly installed cable or an installed cable of the wrong length could lead to malfunctions in the antenna and limited reception. The time and skill needed to install a new antenna and cable usually limits this type of modification for most channel manufacturer vendors, direct sellers and end-users.

The add on external antenna solution mentioned in the background provides a new type of wireless solution configuration capability for a computing platform, but usually requires a cumbersome or easily breakable antenna located where the appropriate communication connection was placed on the computing platform rather than where best situated for the reception of the new type of wireless signals. Currently, only limited solutions exist for a manufacturer, vendor, or end-user to reconfigure an existing computing platform with a new antenna, or to change an existing antenna configuration to accommodate a new one. This is problematic because substantial costs of labor, materials and warranty issues sometimes arise in implementing these solutions.

In one example, a removable antenna is configured for a computing platform. This configuring, for example, includes mounting a bracket on the computing platform designed to accommodate a removable antenna and a removable signal compatible dome. In this example, the removable antenna is mounted on the bracket, and the removable signal compatible dome, configured at least in part on the removable antenna, is also mounted on the bracket.

Figure 1:
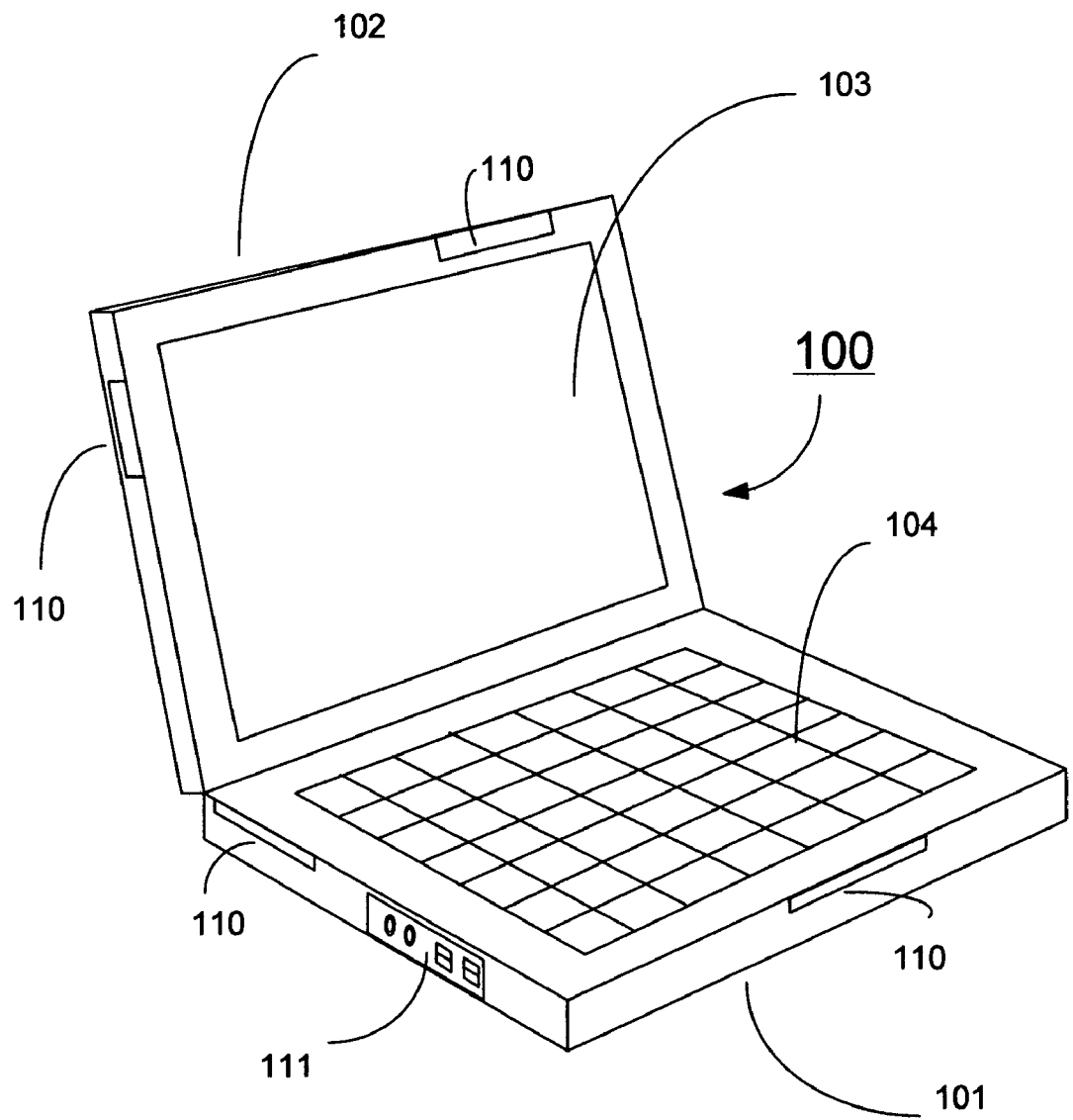
FIG. 1 is an illustration of an example computing platform chassis with appropriate cut-outs for multiple removable antenna modules.

FIG. 1 is an illustration of an example computing platform chassis 100 with appropriate cut-outs 110 for multiple brackets, removable antennas and removable signal compatible domes. FIG. 1, for example, depicts a computing platform chassis as including a computing platform body 101 with a keyboard 104. Although in other examples other input devices may reside on the top surface of computing platform body 101. Computing platform body 101, for example, also includes preexisting connection points 111 mounted on a side surface of computing platform body 101. FIG. 1, for example, also depicts computing platform 100 as including a lid 102, with a screen or monitor 103 on its surface.

In one implementation, cut-outs 110 allow access through an outer shell or covering material of the computing platform chassis 100 for placement of a removable antenna. Furthermore, cut-outs 110 depicted in FIG. 1 are not meant to be limited to any single location, or the locations depicted. Cut-outs 110 may be placed at other locations on computing platform chassis 100's outer surface for favorable antenna reception. These cutouts may be anywhere on the outer surface of the computing platform. Alternatively, brackets may be placed inside computing platform chassis 100, and may not be visible without some disassembly of the computing platform chassis (e.g. underneath keyboard 104). In one example, as described in more detail below, antennas are coupled to brackets within cut-outs 110 and may have wiring routed behind or along the edge of screen 103 and through a hinge or ribbon (not shown) connecting lid 102 to the computing platform body 101. FIG. 1, for example, illustrates a typical laptop mobile computing platform, although this disclosure is not limited to a laptop application. End users or manufacturers may also use this disclosure in, for example, a tablet personal computer, a personal data assistant (PDA), smart phone, media player or any other mobile computing device receiving a wireless signal.

In another example, computing platform 100 is designed to accommodate multiple removable antennas at locations on any exterior or interior surface. In one implementation, multiple brackets and cut-outs on or within the computing platform 100 may allow for placement of one or more removable antennas in favorable signal reception locations based on the requirements of the desired signal. For example, a GPS antenna may need line of sight with a satellite. This line of sight requirement leads to a desired placement on the outside and upward facing surface of a computing platform while it operates (e.g., on the top of the lid) whereas other signals operating according to a separate standard (e.g. WiMax) may operate better somewhere else on the computing platform. Alternatively, two or more signals may require a common location for favorable performance, leading a user to place a plurality of removable antennas together via the same bracket with a removable signal compatible dome configured at least in part on the plurality of removable antennas.

Figure 2:
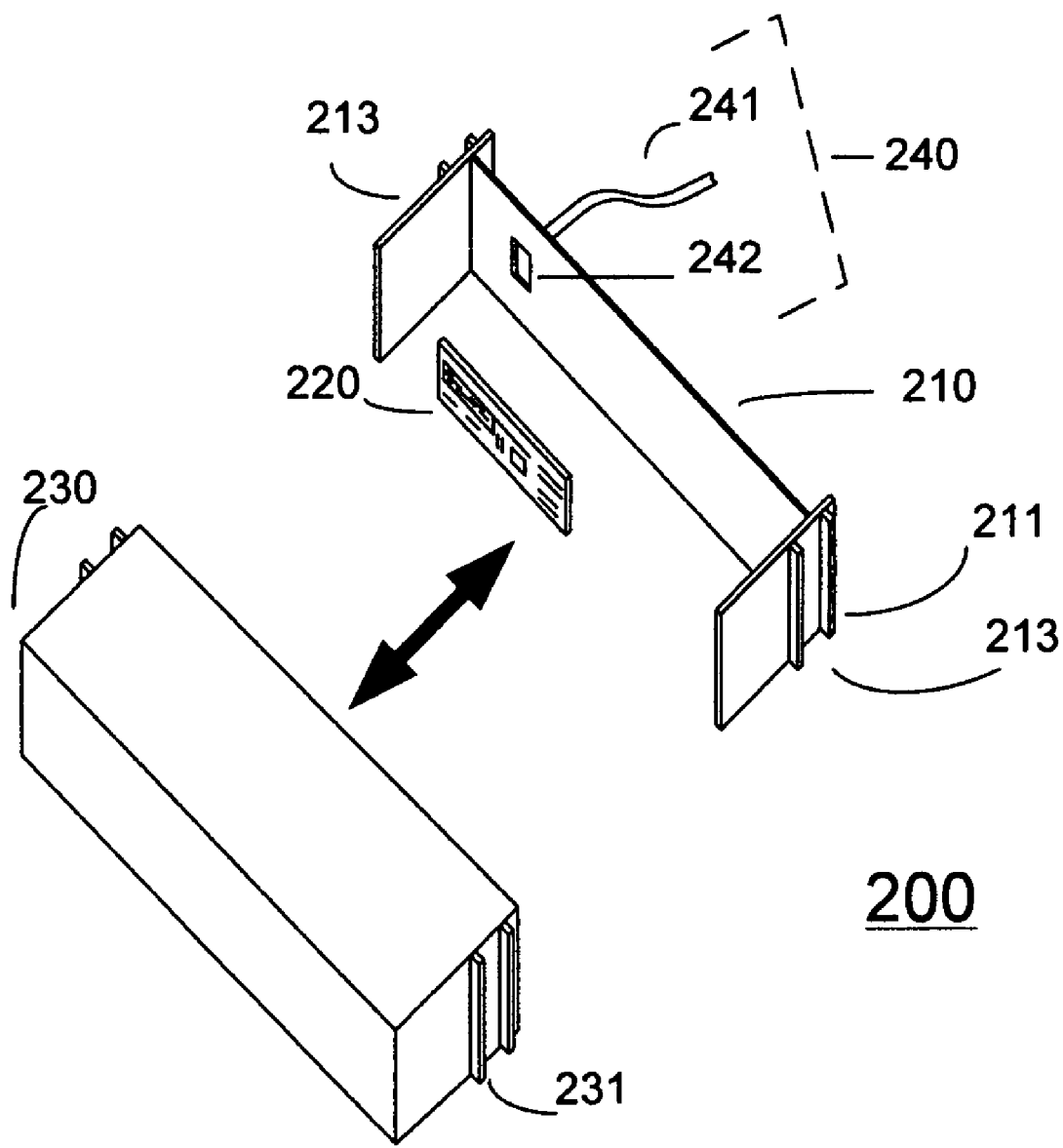
FIG. 2 is an illustration of an example assembly to include, a bracket, a removable antenna, and a removable signal compatible dome.

FIG. 2 is an illustration of an example assembly 200 to include bracket 210, removable antenna 220 and removable signal compatible dome 230. In one implementation, assembly 200 allows for configuration of removable antenna 220 at the point of sale or by an end-user for a mobile computing platform (e.g., computing platform chassis 100). The term signal compatible, for example, refers to a material and configuration of a dome (e.g. dome 230) which allows passage of signals to removable wireless antenna 200 held in bracket 210, or which enhances such signals by their passage through it before reaching removable antenna 220. Additionally, dome 230 may offer protection for removable antenna 220 and associated communication link 240. Dome 230 also may provide a uniform appearance with the outside covering of the computing platform.

In one example, assembly 200 is designed to fit into the antenna cutouts 110 of example computing platform chassis 100 depicted in FIG. 1. For example, bracket 210 holds removable antenna 220, and provides a set of guides 213 for attaching removable signal compatible dome 230 to bracket 210 and thus to a computing platform body 101 as depicted in FIG. 1. In this example, bracket 210 holds removable antenna 220 and signal compatible dome 230 to the body of computing platform chassis 101 with a set of tabs 211 on the outside of edge guides 213. Signal compatible dome 230 may connect directly to the computing platform body 101 via tabs 231 or may snap into position using tabs 211 located on guides 213 of bracket 210.

Also depicted in FIG. 2, for example, is a communication link assembly 240. In one example, communication link assembly 240 serves to link the components (e.g. removable antenna 220) to a computing platform processor (not shown) through an attached communication link assembly 240. In one implementation, communication link assembly 240 includes a cable or wire 241 and an associated connector 242; for example RF coax cable and an ultra miniature low profile coaxial (e.g., U.FL) connector respectively.

In one implementation, bracket 210 may be designed to accommodate a plurality of removable antennas for a computing platform (e.g., computing platform chassis 100). Bracket 210, for example, may then couple or mount to a signal compatible dome appropriate for all types of removable antennas attached to bracket 210. Each removable antenna may then couple to the computing platform through its own communication link, or a combined connection linking all removable antennas held in bracket 210 to the computing platform via the same communication link.

Figure 3:
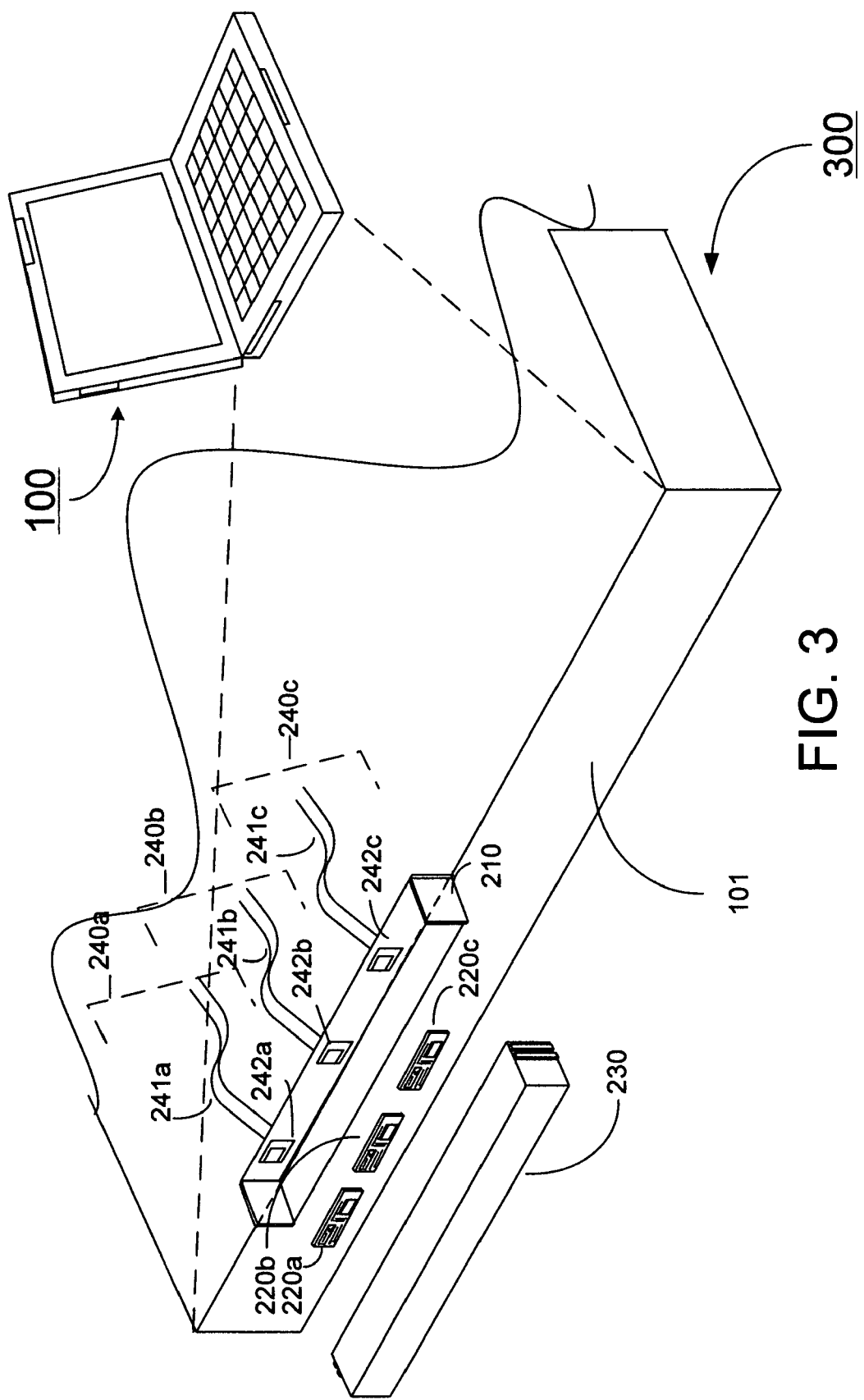
FIG. 3 is an example expanded view of the example assembly mounted to a computing platform chassis.

FIG. 3 is an example expanded view 300 of assembly 200 mounted to computing platform chassis 100. In one example, bracket 210 mounts or couples to a side surface of computing platform body 101 within cutout 110. In this example, multiple removable antennas 220a, 220b, and 220c are depicted in FIG. 3 as attachable to bracket 210 via communication link assemblies 240a, 240b and 240c. Communication link assemblies 240a-c, for example, include connector ports 242a, 242b, and 242c, and an RF cable or wire 241a, 241b, and 241c, respectively. Communication link assemblies 240a-c, for example, connect or couple removable antennas to the computing platform chassis 100 processor (not shown) for computing platform chassis 100.

In one implementation, signal compatible dome 230 is mounted such that antennas 242a, 242b and 242c are covered. Also, for example, if a removable antenna design allows, the signal compatible dome 230 may be mounted such that it is flush with the rest of the computing platform body 101.

In another implementation bracket 210 might be placed inside computing platform 100 in such a way as to limit removal and replacement by most end-users. This internal placement still allows a substantial time savings in removal and replacement of bracket 210 and signal compatible dome 230 by authorized service personnel at the point of sale or designated repair facilities. In addition, authorized service personnel may remove and replace bracket 210 and signal compatible dome 230 without disconnecting or adjusting the more delicate and precisely placed communication link assembly cables or wires (e.g. communication link cable 241 as depicted in FIG. 2).

Figure 4:
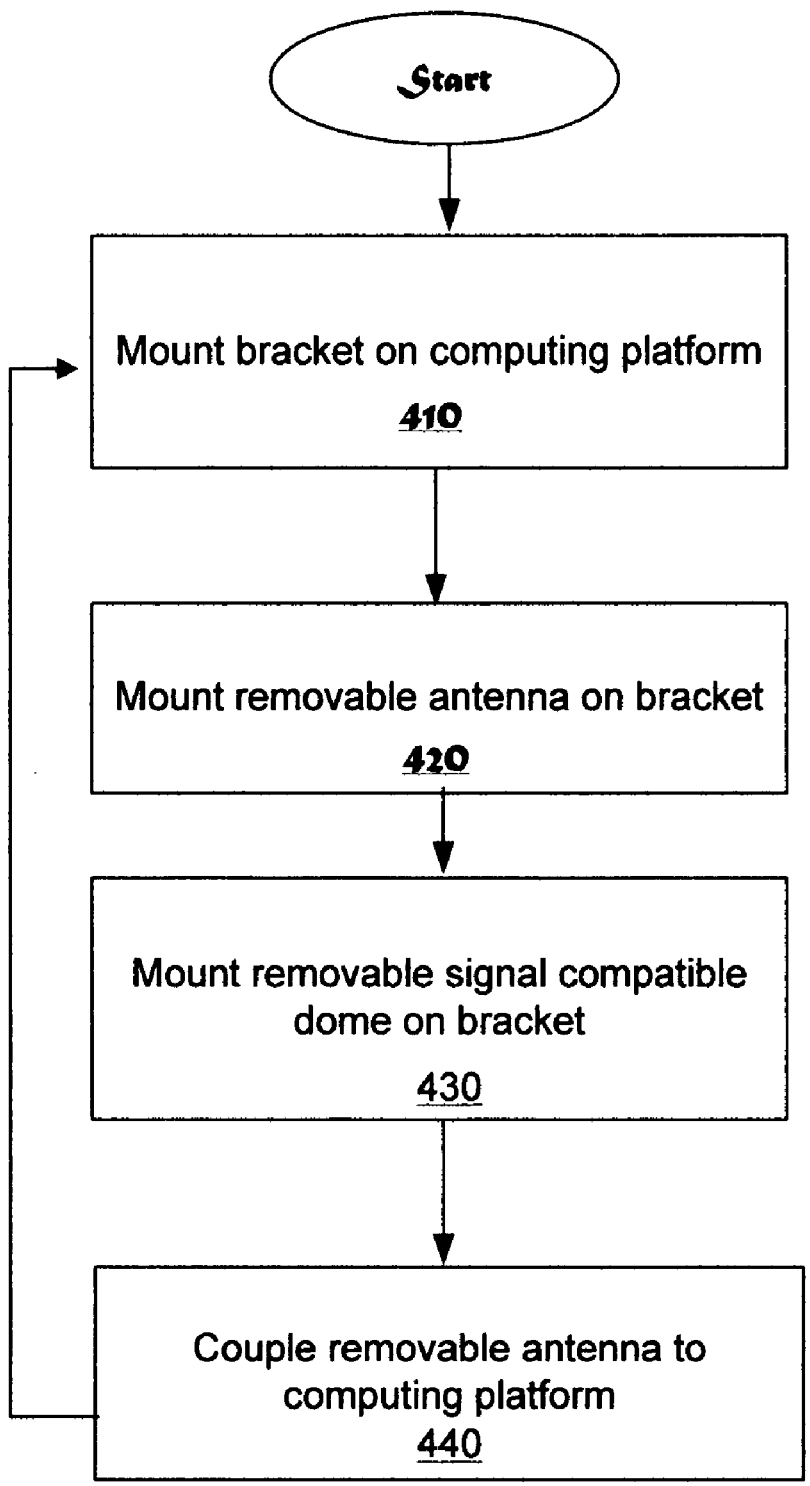
FIG. 4 is a flow chart illustrating the method of configuring a removable antenna module on a computing platform.

FIG. 4 is a flow chart illustrating the method of configuring a removable antenna module on a computing platform. In one example, this method is implemented using computing platform chassis 100 as depicted above in FIG. 1, and bracket assembly 200 as described above in FIG. 2.

In block 410, in one example, bracket 210 is mounted to computing platform chassis 100. Bracket 210, for example, accommodates a removable antenna (e.g., removable antenna 220) and a removable signal compatible dome (e.g., removable signal compatible dome 230).

In block 420, in one example, removable antenna 220 is mounted on bracket 210.

In block 430, in one example, removable signal compatible dome 230, which is signal compatible with removable antenna 220, is mounted on bracket 210. Removable signal compatible dome 230, for example, is configured, at least in part, on removable antenna 220.

In block 440, in one example, removable antenna 220 is coupled to computing platform 100's processor via communication link assembly 240.

In one example, the method may start over at block 410 to mount additional removable antennas, brackets, and signal compatible domes on computing platform chassis 100.

The systems, apparatuses and methods described herein are not inherently related to any particular computing device or other apparatus. Antennas and associated computing platforms can easily support multiple signals such as ultra high frequency (UHF) or very high frequency (VHF) radio reception, infra red (IR), radio frequency identification (RFID), and ultra-wide-band (UWB) signals, and the present disclosure is intended to enable but is not limited to these signal types. In addition, the present disclosure is intended to enable, but is not limited to, wireless protocols such as wireless local area network (WLAN), wireless wide area network (WWAN), wireless metropolitan area network (WMAN) or wireless personal area network (WPAN) protocols. These protocols, for example, are described in standards such as the Industrial Electrical and Electronics Engineers (IEEE) 802.11 a/b/g/n, 802.15, 802.16 and 802.18 standards, Bluetooth™, Zigbee, Global Positioning System (GPS), General Packet Radio Service (GPRS), Universal Mobile Telecommunications System (UMTS) or Third Generation Partnership Project (3GPP), Enhanced Data Rates for GSM Evolution (EDGE), and Third Generation Partnership Project 2 (3GPP2), etc. (Bluetooth is a registered trademark of the Bluetooth Special Interest Group). It should be understood that the scope of the present disclosure is not limited by the types of, the number of, or the frequency of the communication protocols articulated in this disclosure.

In the preceding detailed description numerous specific details are set forth to provide a thorough understanding of the disclosure. However it will be understood by those skilled in the art that the principles laid out in this disclosure may be practiced without these specific details. In other instances, well known methods procedures, components and circuits have not been described in detail so as not to obscure the principles outlined in this disclosure.

While certain features of the disclosure have been illustrated and described herein, many modifications, substitutions changes and equivalents will now occur to those skilled in the art. It is therefore to be understood that the appended claims are intended to cover all such modifications and changes as fall within the true spirit of the principles disclosed.

What is claimed is:

1. A method comprising:
configuring a removable antenna for a mobile computing platform, configuring the removable antenna to include:
mounting a bracket on the mobile computing platform, the bracket to accommodate a communication link, a removable antenna, and a removable signal compatible dome;
mounting the removable antenna on the bracket;
coupling the removable antenna to the mobile computing platform via the communication link; and
mounting the removable signal compatible dome on the bracket, the removable signal compatible dome configured at least in part on the removable antenna.

2. A method according to claim 1, wherein the communication link includes a radio frequency (RF) coax cable and an ultra miniature low profile coaxial (U.FL) connector.

3. A method according to claim 1, wherein the removable antenna is enabled to operate in compliance with one or more standards to include Industrial Electrical and Electronics Engineers (IEEE) 802.11a/b/g/n, 802.15, 802.16 and 802.18, Bluetooth™, Zigbee , Global Positioning System (GPS), General Packet Radio Service (GPRS), Universal Mobile Telecommunications System (UMTS) or Third Generation Partnership Project (3GPP), Enhanced Data rates for Global system for mobile telecommunications Evolution (EDGE), and Third Generation Partnership Project 2 (3GPP2).

4. A method according to claim 1 wherein the removable antenna is enabled for one or more signal types selected from a group of signal types to include: infra red (IR), radio frequency identification (RFID), ultra-wide-band (UWB) types, ultra high frequency (UHF) or very high frequency (VHF) radio reception.

5. A method according to claim 1, wherein the bracket accommodates a plurality of removable antennas and the dome is signal compatible with the plurality of removable antennas.

6. A method according to claim 1, further comprising:
configuring a second removable antenna for the same computing platform, configuring to include:
mounting a second bracket on the computing platform, the second bracket to accommodate the second removable antenna and a second removable signal compatible dome;
mounting the second removable antenna on the second bracket; and
mounting the second removable signal compatible dome on the second bracket, the second removable signal compatible dome configured, at least in part, on the second removable antenna.

7. A method according to claim 1, the communication link to couple a plurality of removable antennas to the mobile computing platform.

8. An apparatus comprising:
a bracket configured to mount a removable antenna and a removable signal compatible dome on a mobile computing platform, the bracket to accommodate a communication link and enable multiple removable antenna and removable signal compatible dome combinations, the communication link to couple the removable antenna to the mobile computing platform.

9. An apparatus according to claim 8, further comprising:
at least one removable antenna; and
a signal compatible dome configured at least in part on the at least one removable antenna mounted to the bracket.

10. An apparatus according to claim 9, wherein the at least one removable antenna is enabled to operate in compliance with one or more standards to include: Industrial Electrical and Electronics Engineers (IEEE) 802.11a/b/g/n, 802.15, 802.16 and 802.18, Bluetooth™, Zigbee , Global Positioning System (GPS), General Packet Radio Service (GPRS), Universal Mobile Telecommunications System (UMTS) or Third Generation Partnership Project (3GPP), Enhanced Data rates for Global system for mobile telecommunications Evolution (EDGE), and Third Generation Partnership Project 2 (3GPP2).

11. An apparatus according to claim 8, wherein the at least one removable antenna is enabled for one or more signal types selected from a group of signal types to include: infra red (IR), radio frequency identification (RFID), ultra-wide-band (UWB), ultra high frequency (UHF) or very high frequency (VHF) radio reception.

12. An apparatus according to claim 8, the communication link to couple a plurality of removable antennas to the mobile computing platform.

13. A system comprising:
a removable antenna;
a removable signal compatible dome configured at least in part on the removable antenna; and
a bracket to mount the removable antenna and the removable signal compatible dome on a mobile computing platform, the bracket to accommodate a communication link and enable multiple removable antenna and removable signal compatible dome combinations, the communication link to couple the removable antenna to the mobile computing platform.

14. A system according to claim 13, wherein the removable antenna is enabled to operate in compliance with one or more standards to include: Industrial Electrical and Electronics Engineers (IEEE) 802.11a/b/g/n, 802.15, 802.16 and 802.18, Bluetooth™, Zigbee, Global Positioning System (GPS), General Packet Radio Service (GPRS), Universal Mobile Telecommunications System (UMTS) or Third Generation Partnership Project (3GPP), Enhanced Data rates for Global system for mobile telecommunications Evolution (EDGE), and Third Generation Partnership Project 2 (3GPP2).

15. A system according to claim 13, wherein the communication link includes an ultra miniature low profile coaxial (U.FL) connector and a cable.

16. A system according to claim 13, wherein the bracket accommodates a plurality of removable antennas and a signal compatible dome compatible with the all removable antennas mounted to the bracket.

17. A system according to claim 13, further comprising:
a second removable antenna;
a second removable signal compatible dome configured at least in part on the second antenna; and
a second bracket to mount the second removable antenna and the second removable signal compatible dome on the computing platform, the bracket to enable multiple removable antenna and removable signal compatible dome combination.

18. A system according to claim 13, the communication link to couple a plurality of removable antennas to the mobile computing platform.

* * * * *